United States Patent
He et al.

(10) Patent No.: US 10,652,119 B2
(45) Date of Patent: May 12, 2020

(54) AUTOMATIC RECOVERY ENGINE WITH CONTINUOUS RECOVERY STATE MACHINE AND REMOTE WORKFLOWS

(71) Applicant: Microsoft Technology Licensing, LLC, Redmond, WA (US)

(72) Inventors: Lei He, Redmond, WA (US); Wilson Man-Hong Li, Redmond, WA (US); Tiancong Zhou, Bellevue, WA (US); Swati Singh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 31 days.

(21) Appl. No.: 15/636,929

(22) Filed: Jun. 29, 2017

(65) Prior Publication Data

US 2019/0007290 A1    Jan. 3, 2019

(51) Int. Cl.
*H04L 12/26* (2006.01)
*H04L 12/24* (2006.01)

(52) U.S. Cl.
CPC ...... *H04L 43/0823* (2013.01); *H04L 41/0663* (2013.01); *H04L 43/0817* (2013.01); *H04L 41/0631* (2013.01); *H04L 41/0645* (2013.01); *H04L 41/5009* (2013.01)

(58) Field of Classification Search
CPC ............. H04L 43/0823; H04L 41/0631; H04L 41/0645
USPC ........................................................ 370/245
See application file for complete search history.

(56) References Cited

U.S. PATENT DOCUMENTS

| | | | |
|---|---|---|---|
| 8,060,792 B2 | 11/2011 | Sivasubramanian et al. | |
| 8,560,887 B2 | 10/2013 | Behrendt et al. | |
| 8,612,396 B1 | 12/2013 | McAlister et al. | |
| 9,009,708 B2 | 4/2015 | Lu et al. | |
| 9,076,311 B2 | 7/2015 | Rachamadugu | |
| 10,460,324 B1* | 10/2019 | Westen | G06Q 20/20 |
| 2012/0130936 A1* | 5/2012 | Brown | G06N 5/048 |
| | | | 706/52 |
| 2012/0246638 A1* | 9/2012 | He | G06F 9/45558 |
| | | | 718/1 |

(Continued)

OTHER PUBLICATIONS

Josh Reuben, "Workflow 4 State Machine—Distributed Tracking Visualization", http://geekswithblogs.net/JoshReuben/archive/2011/06/07/workflow-4.0.1-statemachine-distributed-tracking-visualization.aspx, Published on: Jun. 7, 2011, 35 pages.

(Continued)

*Primary Examiner* — Christopher R Crompton

(57) ABSTRACT

Various embodiments of the present technology generally relate to systems and methods for self-healing services and automatic recovery of distribute systems. Some embodiments of the present technology leverage all the available synthetic, customer, client, server, support signals from various sources to intelligently and in real-time detect outages, root cause outages to recoverable targets (e.g., for auto recovery actions), identify the right engineering teams (e.g., for faster manual mitigation), and perform the appropriate recovery action (such as recycle service, reboot server, switch out a faulty rack) or other mitigation actions such as routing, collecting debug information, alerting to the right team, or alert suppression. Some embodiments separate signal monitoring and workflow coordination.

20 Claims, 9 Drawing Sheets

(56) References Cited

U.S. PATENT DOCUMENTS

2013/0305080 A1* 11/2013 Behrendt ............ G06F 11/3006
714/2
2018/0248758 A1* 8/2018 Ali ..................... H04L 41/0677

OTHER PUBLICATIONS

"Automatic Recovery of Workflow Process Instances", https://docs.oracle.com/cd/B31104_02/books/BizProcess/BizProcess_UnderstandingWorkflowDesign33.html, Published on: Jun. 2004, 1 pages.

Azbill, Burke, "How to use the REST API to Start a Workflow", https://www.vcoteam.info/articles/learn-vco/268-how-to-use-the-rest-api-to-start-a-workflow.html, Published on: Oct. 17, 2013, 27 pages.

\* cited by examiner

AUTOMATIC RECOVERY ENGINE WITH CONTINUOUS RECOVERY STATE MACHINE AND REMOTE WORKFLOWS

BACKGROUND

Modern electronic devices such as computers, tablets, mobile phones, wearable devices and the like have become a common part of modern life. Many users of electronic devices routinely utilize various types of software applications for business and personal activities. Examples of software applications can include word processors, spreadsheet applications, e-mail clients, notetaking software, presentation applications, games, computational software, and others. These software applications can also be used to perform calculations, produce charts, organize data, receive and send e-mails, communicate in real-time with others, and the like. The software applications can range from simple software to very complex software. Moreover, there are a variety of channels for delivering software and services to end-users such as cloud computing services.

Examples of popular cloud computing services include, but not limited to, software as a service (SaaS), platform as a service (PaaS), and the like. For example, SaaS is becoming a popular delivery mechanism where software applications are consumed by end-users over the internet. As a result, end-users do not have to install and run the applications locally as the applications are maintained in the cloud by the service provider. With these types of cloud computing services, the provider hosts the hardware and/or software resources that end-users can access over a network connection. As a result, the service provider must manage and maintain all of the hardware and software infrastructure.

Over time, systems components will fail and upgrades (e.g., hardware upgrades and software upgrades) will be needed. In addition, demand may expand or contract for particular services which will require more or fewer resources. As a result, service providers need to actively monitor data centers and service demands as well as develop protocols for upgrades, recovery from failures, expansion, and the like. In some cases, these protocols may be automatically implemented as waiting for technician approval and/or execution may be inefficient.

Overall, the examples herein of some prior or related systems and their associated limitations are intended to be illustrative and not exclusive. Upon reading the following, other limitations of existing or prior systems will become apparent to those of skill in the art.

OVERVIEW

Various embodiments of the present technology generally relate to systems and methods for self-healing services and automatic recovery of distributed systems. More specifically, some embodiments provide for systems and methods for implementing automated recovery features. For example, some embodiments receive, pull, or detect multiple states (e.g., static states and transient states) of one or more hosted services. The system can then automatically perform a root cause analysis to identify an underlying problem within the one or more hosted services. The root cause analysis can be based, at least in part, on the multiple states of the one or more hosted services. In addition, various embodiments may use artificial intelligence (e.g., a supervised machine learning model) to identify the underlying problem. Once the root cause has been identified, the system can determine a recovery workflow (e.g., recycling the one or more hosted services, rebooting one or more servers, switching out a faulty rack, rerouting traffic, collecting additional information, generating one or more notifications to an identified team, or temporarily suppressing team notifications). In some embodiments, the system can dynamically build and update a real-time service dependency graph that can be used as part of the root cause analysis.

Some embodiments, can receive multiple signals identifying conditions of one or more hosted services. A root cause of a potential underlying problem consistent with the conditions of the one or more hosted services can be identified. In some embodiments, various supervised or unsupervised machine learning techniques and machines may be utilized. As another example, statistical model based anomaly detection can be used in some embodiments. A recovery or mitigation workflow to resolve the potential underlying problem can be set and automatically executed. In some embodiments, the monitoring of the conditions of the one or more hosted services can be logically separated from the recovery or mitigation. In some embodiments, a finite state machine can be used to track states of the one or more hosted services. The finite state machine can have multiple states which can be reached as conditions of the one or more hosted services are met. Some of the states can call for the execution of a recovery or mitigation workflow. This can result in a signal being transmitted to a control plane to initiate the recovery or mitigation workflow which can ultimately select and/or implement one or more actions.

Embodiments of the present technology also include computer-readable storage media containing sets of instructions to cause one or more processors to perform the methods, variations of the methods, and other operations described herein.

Some embodiments provide for a system having one or more processors, memory, servers running one or more hosted services, monitoring platform, control plane, passive detection module, root cause analyzer, correlation module, authoring and optics user interface, machine learning classifiers, and/or other components. For example, in some embodiments, the monitoring platform can actively monitor the one or more hosted services in real-time. The monitoring platform can include a recovery state machine having multiple states that can be accessed depending on conditions of the one or more hosted services. The multiple states can include recovery workflow triggers. In some embodiments, the monitoring platform can analyze the signals and conditions that are available. For example, the monitoring platform may perform a time series analysis to make additional decisions or generate synthetic conditions.

The control plane can be communicably coupled to the monitoring platform. The control plane can include a workflow coordinator separate from the monitoring platform to manage and execute recovery services for the one or more hosted services in response to receiving one of the recovery workflow triggers from the monitoring platform. The passive detection module can identify component outages or underlying infrastructure problems. The root cause analyzer can use information collected by the monitoring platform and identify possible system failures that may be underlying detected failures. The correlation module can correlate the conditions of the one or more hosted services detected by the monitoring platform to identify one or more recovery actions. The authoring and optics user interface can include a screen to allow a user set actions within a workflow for the recovery services and a screen to view notifications, workflow status, and current state of the recovery state machine.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Embodiments of the present technology will be described and explained through the use of the accompanying drawings in which.

Figure 1:
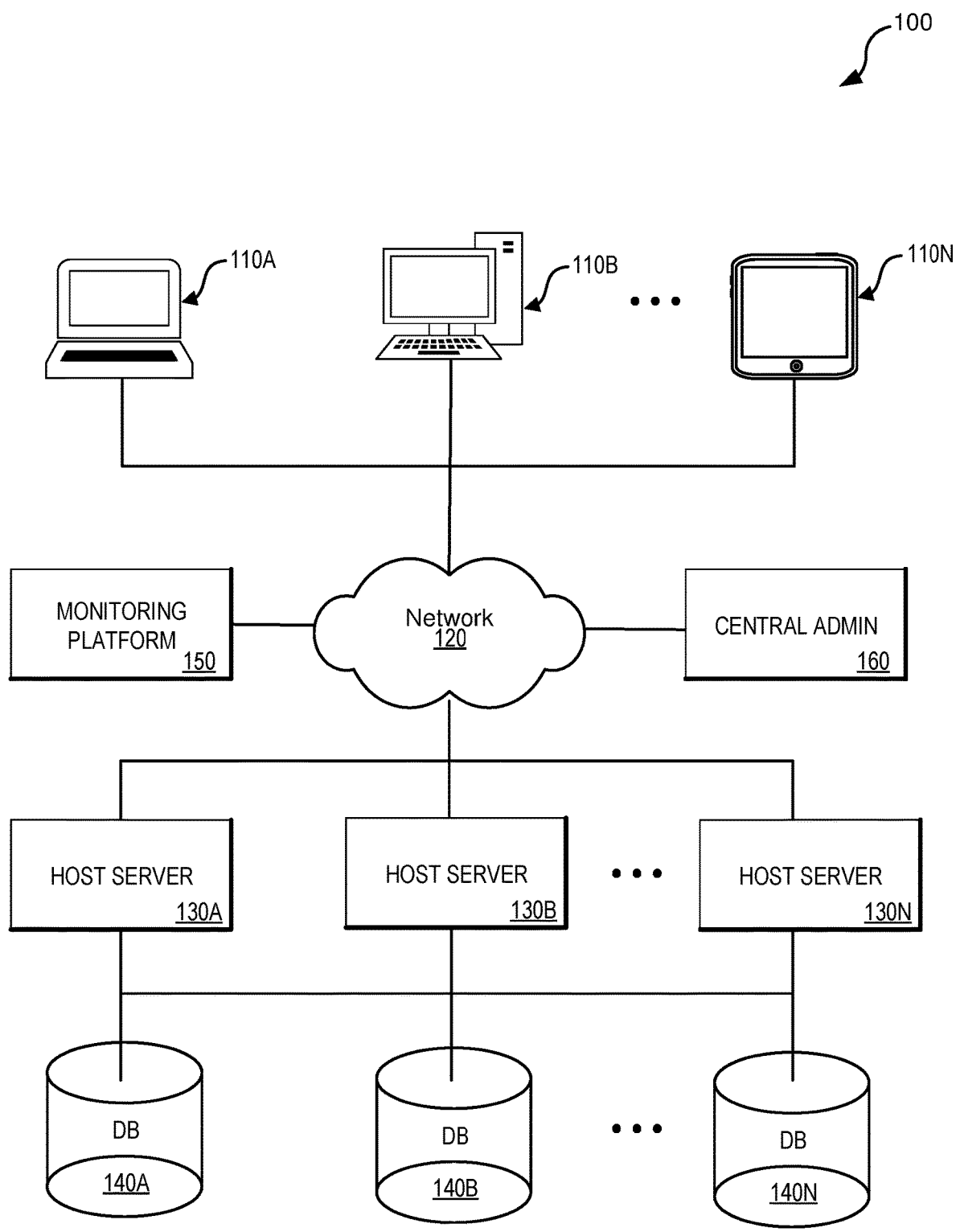
FIG. 1 illustrates an example of an environment capable of implementing an automated recovery engine in accordance with some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to systems and methods for self-healing services and automatic recovery of distributed systems. For example, software as a service has become an integral part of many business. Providers of these services need systems in place to automatically scale and recovery from various faults. Traditionally, system scaling and recovery has been a manually intensive process with only common activities being automated. In contrast, various embodiments of the present technology leverage all the available synthetic, customer, client, server, support signals from various sources to intelligently and in real-time detect outages, root cause outages to recoverable targets (e.g., for auto recovery actions), identify the right engineering teams (e.g., for faster manual mitigation), and perform the appropriate recovery action (such as recycle service, reboot server, switch out a faulty rack) or other mitigation actions such as routing, collecting debug information, alerting to the right team, or alert suppression.

Some embodiments use a big data streaming computing model layer that abstracts streaming data sets and operators to minimize or hide underlying management of the data movement and resilience handling from the application. As a result, the system can automatically deploy changes, scan for errors, and look for hardware problems. Some embodiments can include a real-time monitoring system that processes large number of signals (e.g., in the order of 1 million or more per second) from various sources to find underlying outages and root cause. These real-time analytics used by some embodiments can include aggregation, filtering, temporal join, time series analysis such as statistical model based anomaly detection, and/or other supervised or unsupervised machine learning. Moreover, the use of finite state machines, logic built on directed acyclic graphs, and other directed cycle decision making technology allows the system to effectively employ a memory-base decision making scheme.

Various embodiments can provide for a static and dynamically configurable alert deduplication and recovery rules. For example, if a machine is unhealthy (e.g., out of disk, OOM, CPU 100%, out of TCP connection, etc.) and a critical monitor failure occurred (e.g., paging alert), then all subsequent monitor failures occurred on the machine are correlated to the same root cause and communicated accordingly. Moreover, some embodiments provide a continuous recovery state machine that triggers remote recovery workflows implemented using a control plane (or central admin). Some embodiments allow for manual or automated remote powershell command or workflow executions. Some embodiments can use a hierarchical set of state machines where some feed into others. For example, some embodiments can include one or more local finite state machines to monitor individual machines along with a centralized state machine system that integrates with remote workload specific recovery workflows (e.g., via Rest API or Remote PowerShell).

Various embodiments of the present technology provide for a wide range of technical effects, advantages, and/or improvements to computing systems and components. For example, various embodiments include one or more of the following technical effects, advantages, and/or improvements: 1) reducing the number of user interactions for maintaining large distributed systems; 2) automatically identifying and a correcting issues within large distributed computing systems; 3) creates a new format for tracking and correcting conditions and states within cloud-computing systems; 4) creates improvements to the way computing devices operate; 5) uses unconventional and non-routine operations as part of the process to automatically detect and mitigate performance issues of computing systems; 6) decouples tracking and recovery workflow execution; and/or 7) changes the manner in which a computing system reacts, processes and manages continuous real-time monitoring and recovery. Some embodiments include additional technical effects, advantages, and/or improvements to computing systems and components.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to a large data centers and cloud computing systems with dynamic topologies, embodiments of the present technology are equally applicable to various other instantiations where system monitoring and recovery are needed (e.g., network configuration).

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 9:
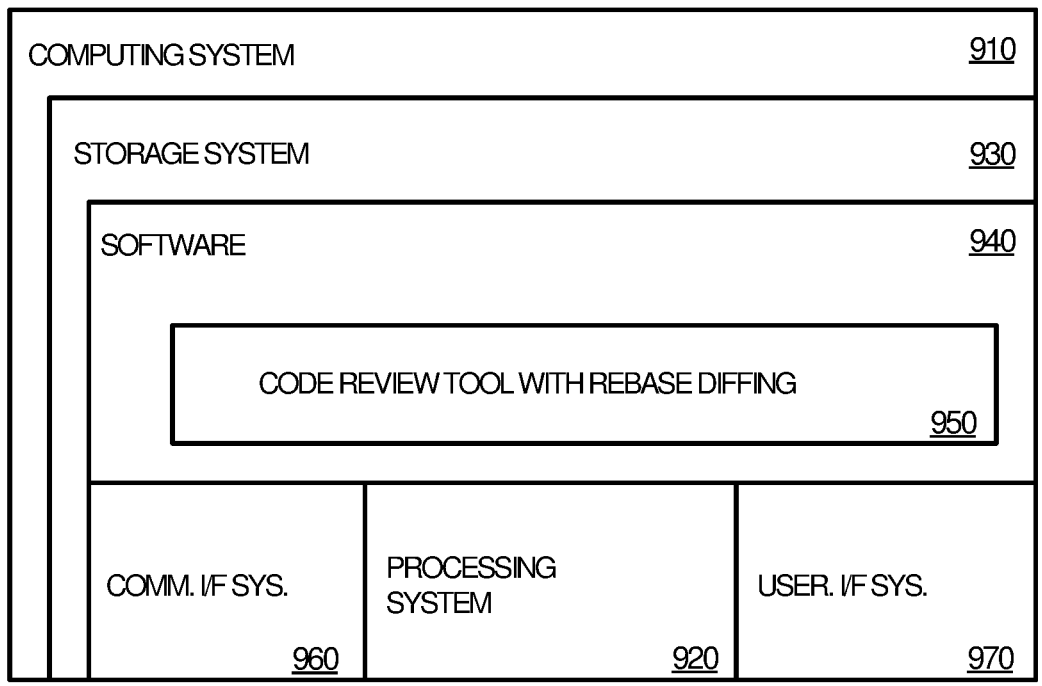
FIG. 9 illustrates an example of a computing system, which is representative of any system or collection of systems in which the various applications, services, scenarios, and processes disclosed herein may be implemented.

FIG. 1 illustrates an example of an environment 100 capable of implementing an automated recovery engine in accordance with some embodiments of the present technology. As illustrated in FIG. 1, environment 100 may include one or more computing devices 110A-110N, communications network 120, host servers 130A-130N, database 140A-140N, monitoring platform 150, and central admin (or control plane) 160. Computing devices 110A-110N can be any computing system capable of running an application natively or in the context of a web browser, streaming an application, or executing an application in any other manner. Examples of computing system 110 include, but are not limited to, personal computers, mobile phones, tablet computers, desktop computers, laptop computers, wearable computing devices, thin client computing devices, virtual and/or augmented reality computing devices, virtual machine hosting a computing environment, distributed application, server computer, computing cluster, application hosted as software as a service (SaaS), application running on a platform as a service (PaaS), application running on an infrastructure as a service (IaaS) or any other form factor, including any combination of computers or variations thereof. One such representative architecture is illustrated in FIG. 9 with respect to computing system 910.

Those skilled in the art will appreciate that various components (not shown) may be included in computing devices 110A-110N to enable network communication with communications network 120. In some cases, communications network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Monitoring platform 150 can receive, pull, and process information from various system components such as host servers 130A-130N, databases 140A-140N, utility grids, automatic transfer stitches, uninterrupted power supplies, power distribution units, cooling equipment, backup generators, and other components. For example, monitoring platform may receive various signals such as processor utilization rates, wait times, response times, queue lengths, and the like. These signals can be used to create synthetic conditions that are based on a combination of two or more raw signals. Monitoring platform 150 can use these signals and conditions to detected potential issues and initiate a recovery process via central admin 160. The recovery process can be a multiple step trouble shooting and executing of one or many workflows (e.g., through a compliant just in time elevation system). The workflows may be parallel and asynchronous in some embodiments.

For example, a recovery workflow may include one or more of the following decisions and operations. If a component is determined to be unhealthy for a period of time (e.g., 5 min), then the central admin 160 may recycle app pool for the protocol. If a component is determined to be unhealthy for second period of time (e.g., 10 min), the system may reboot the machine, which in itself is a workflow that checks the parent scope health (e.g., database active copy state), as well as health of all the other machines in the parent scope (e.g. CPU), before the reboot. If still the component is still unhealthy by a third period of time (e.g., 15 min), the system may place the machine in maintenance. If the component is still unhealthy at a fourth period of time (e.g., 30 minutes), central admin 160 can send one or more paging alerts.

Figure 2:
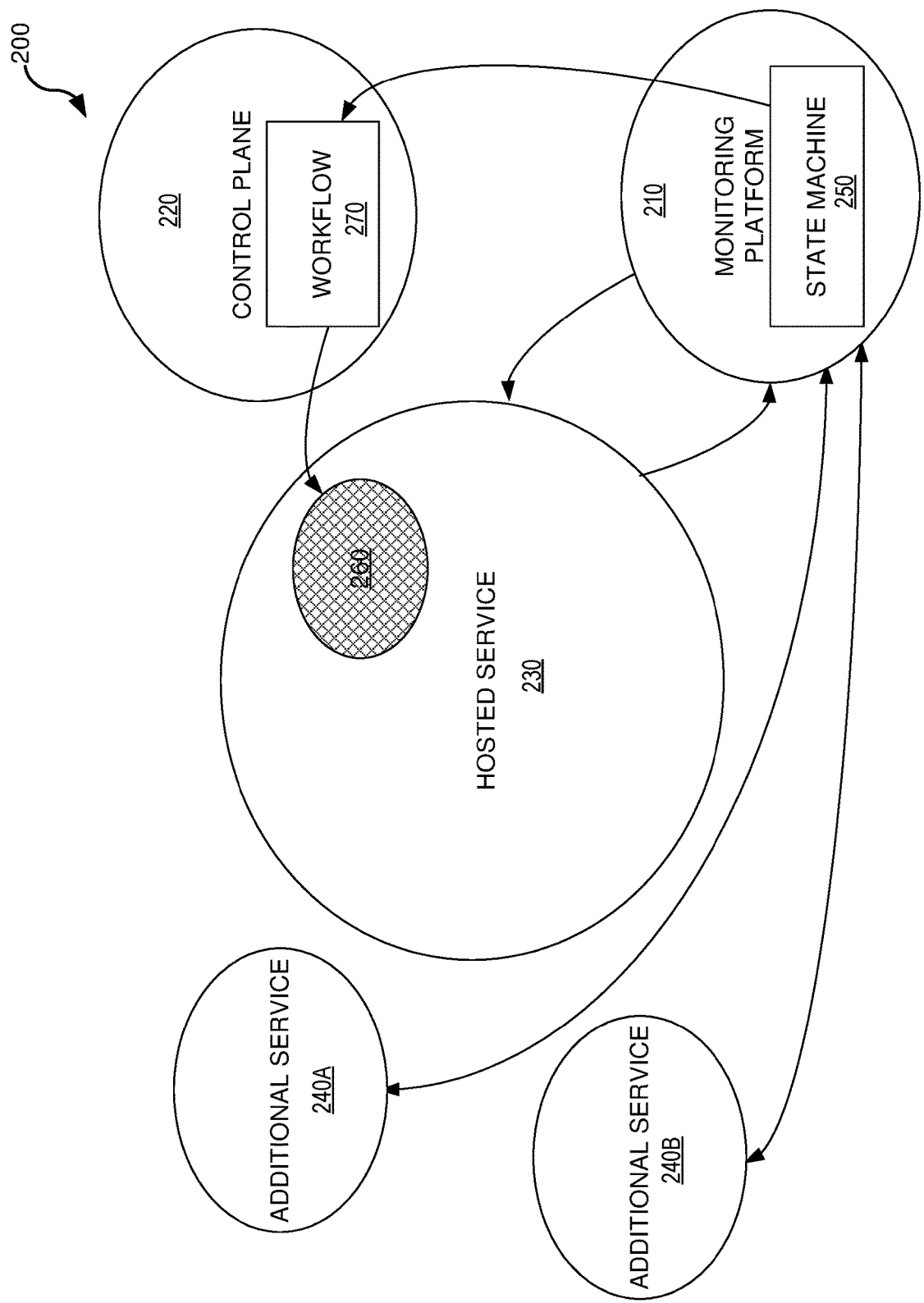
FIG. 2 illustrates an example of a system with segregated monitoring system and control plane according to one or more embodiments of the present technology.

FIG. 2 illustrates an example of a system 200 with segregated monitoring platform 210 and control plane 220 according to one or more embodiments of the present technology. As illustrated in FIG. 2, monitoring platform 210 can monitor various conditions of hosted service 230 and additional services 240A and 240B. The conditions of hosted service 230 and additional services 240A and 240B can be used to determine a current state of the system by navigating through a finite state machine 250 to detect issue 260. Finite state machine 250 can be separate from the workflow coordinator 270 which is designed to select and implement needed workflows to mitigate detected issue 260. By decoupling monitoring platform 210 and control plane 220, an agile generic monitoring state machine can be used that integrates with workload specific data center management workflows (e.g., via Rest API, Remote Powershell, and other interfaces) that meet the scale, compliance and security requirements of a mission critical service.

Figure 3:
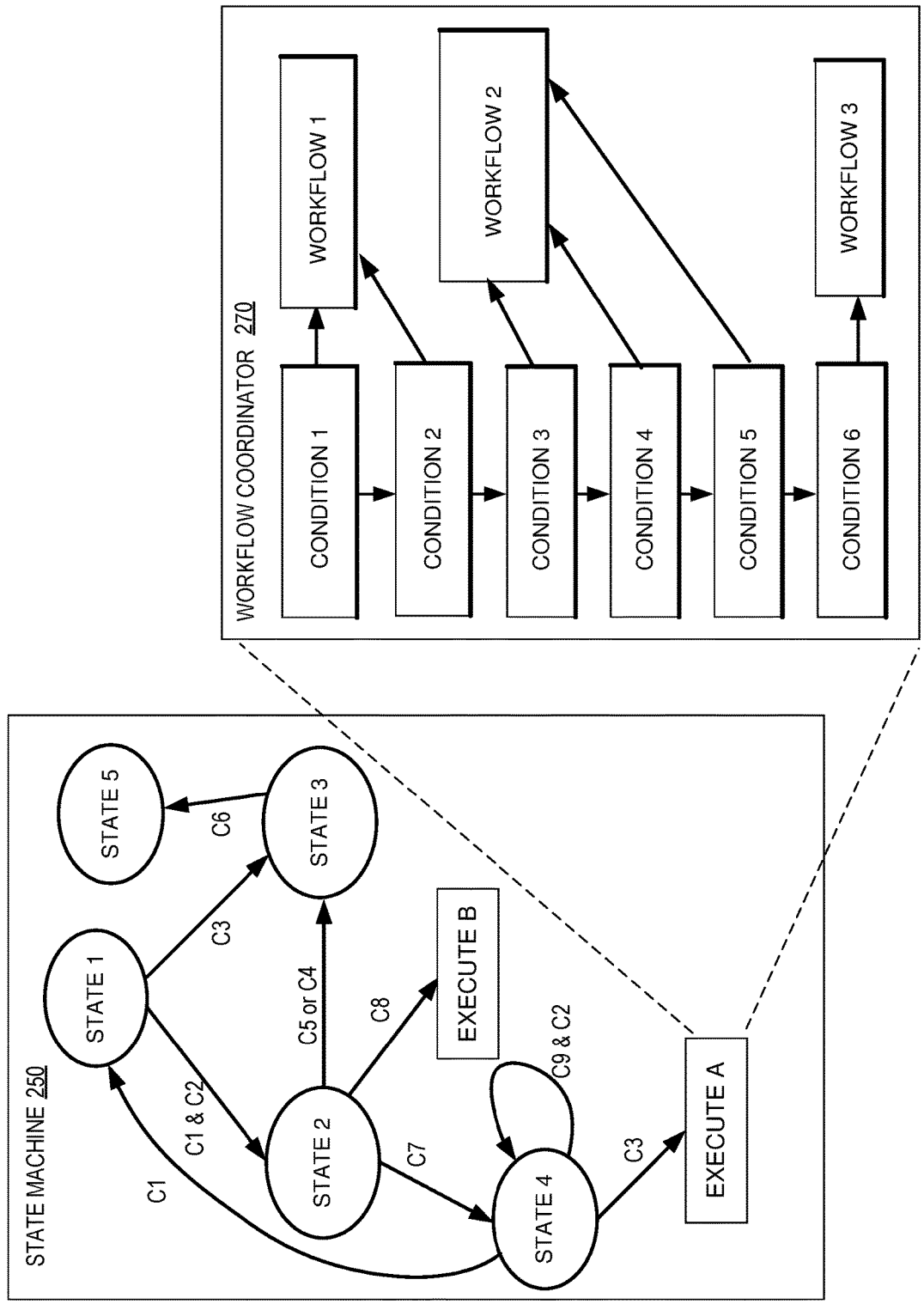
FIG. 3 illustrates a state machine with segregated workflow coordination that may be used in one or more embodiments of the present technology.

FIG. 3 illustrates an example of finite state machine 250 with segregated workflow coordinator 270 that may be used in one or more embodiments of the present technology. Finite state machine 250 includes multiple states, conditions and actions. Upon initialization, monitoring platform can keep track of the current state of the by navigating the connections between the states of the finite state machine in response to the current conditions. Once an action state is reached, a signal can be transmitted to workflow coordinator 270 which can determine the appropriate recovery workflow by working through various logic to ultimately select and/or implement one or more workflow actions.

The following table illustrates an examples of a recovery pattern and a remote action that may be used for two different monitored targets:

|  | Monitored Target | Scenario | Logic |
| --- | --- | --- | --- |
| Recovery Pattern | A DAG (Database Availability Group) that consists of 16 mailbox servers | Monitor the health state of the DAG over time, and recover if the DAG is unhealthy. One machine is causing a protocol (e.g. OWA) to fail. | If unhealthy for 5 min, recycle app pool for the protocol. If unhealthy for 10 min, reboot machine. If still unhealthy at 15 min, put machine in maintenance If unhealthy at 30 minute, send paging alert |
| Remote Action | A mailbox server | Reboot one or more identified root cause machine (mail box server) in an unhealthy DAG | Machine is stateful, therefore need to check the parent scope health (e.g., database active copy state), as well as health of all the other machines in the parent scope (e.g. CPU), before the reboot. |

Figure 4:
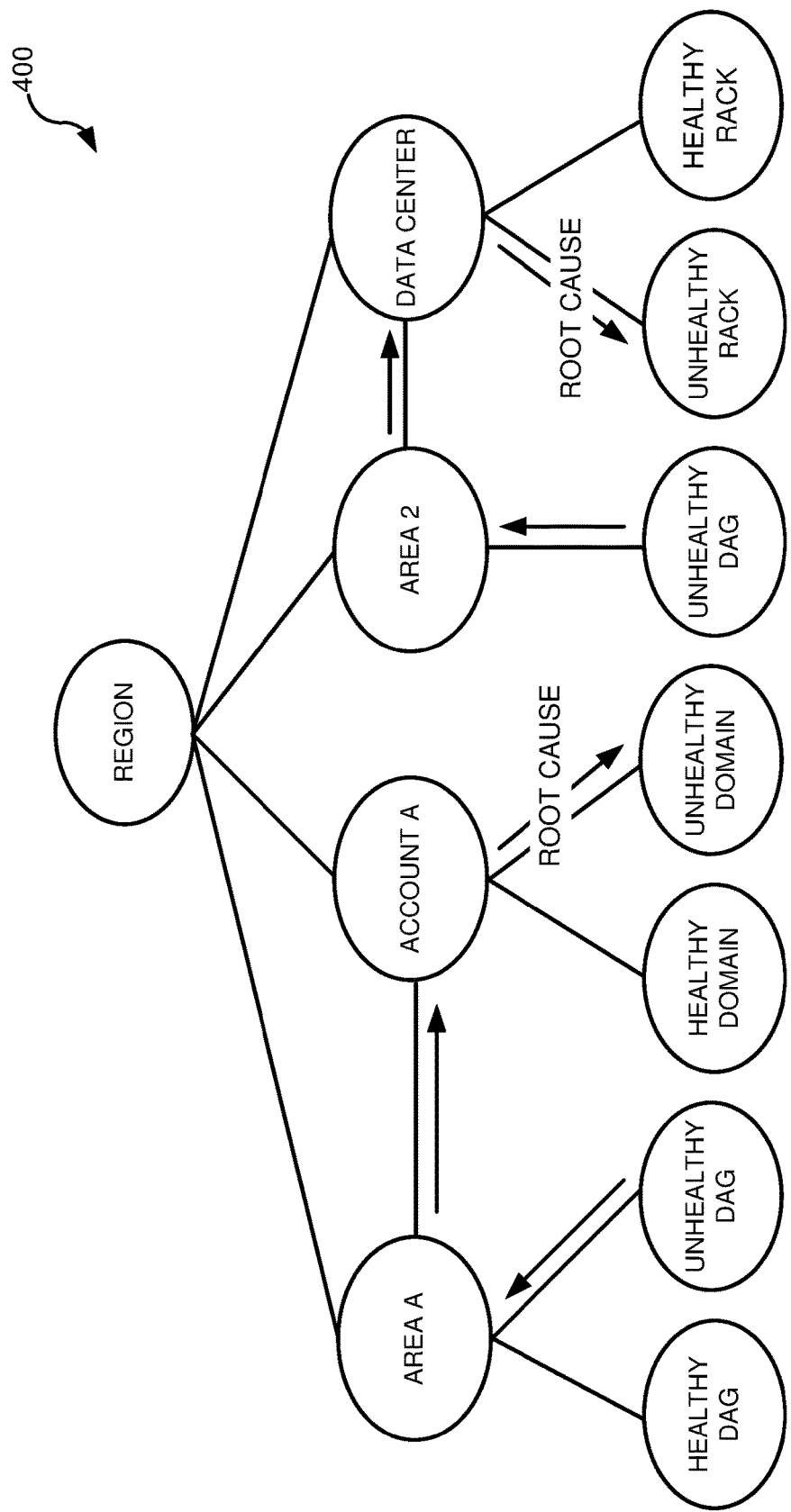
FIG. 4 illustrates an example of a graph traversal to identify a root cause of a problem that may be used in one or more embodiments of the present technology.

FIG. 4 illustrates an example of a graph traversal 400 to identify a root cause of a problem that may be used in one or more embodiments of the present technology. As discussed above, various embodiments of the present technology provide an automated recovery framework that can be applied to vast distributed systems built on components and scale units that function together through intricate dependencies. The most common root cause of service outage can be caused by a single component on a selected set of capacity units. As part of the automated recovery, the monitoring system and control plane needs to be able to identify the faulty component instances that caused the monitoring failures and apply the appropriate safe recovery workflows.

Some embodiments use a dependency graph based root cause analysis that leverages both domain knowledge based on relatively static architecture rules. For example, these relatively static rules may represent the data center topology (e.g., components and interconnections) such as data center availability groups (DAGs) physically built on racks of machines in multiple different data centers. Some embodiments also leverage information in instrumented signals to capture more static and transient information such as which domain controller is serving requests for a given DAG, or what front-end machine(s) are servicing a particular DAG.

Using this information, some embodiments can dynamically build and update a real-time service dependency graph that is the foundation of a graph traversal based root cause analysis. As the graph is created and updated, the system can navigate the graph to identify a root cause. For example, given a DAG monitor failure, find the FrontEnd Rack that contributed to the failure, and collate all DAG failures attributed to the same Café rack and suppress any alert noises; or find the faulty contain controller that caused DAG and monitor failures and collate those alerts.

Figure 5:
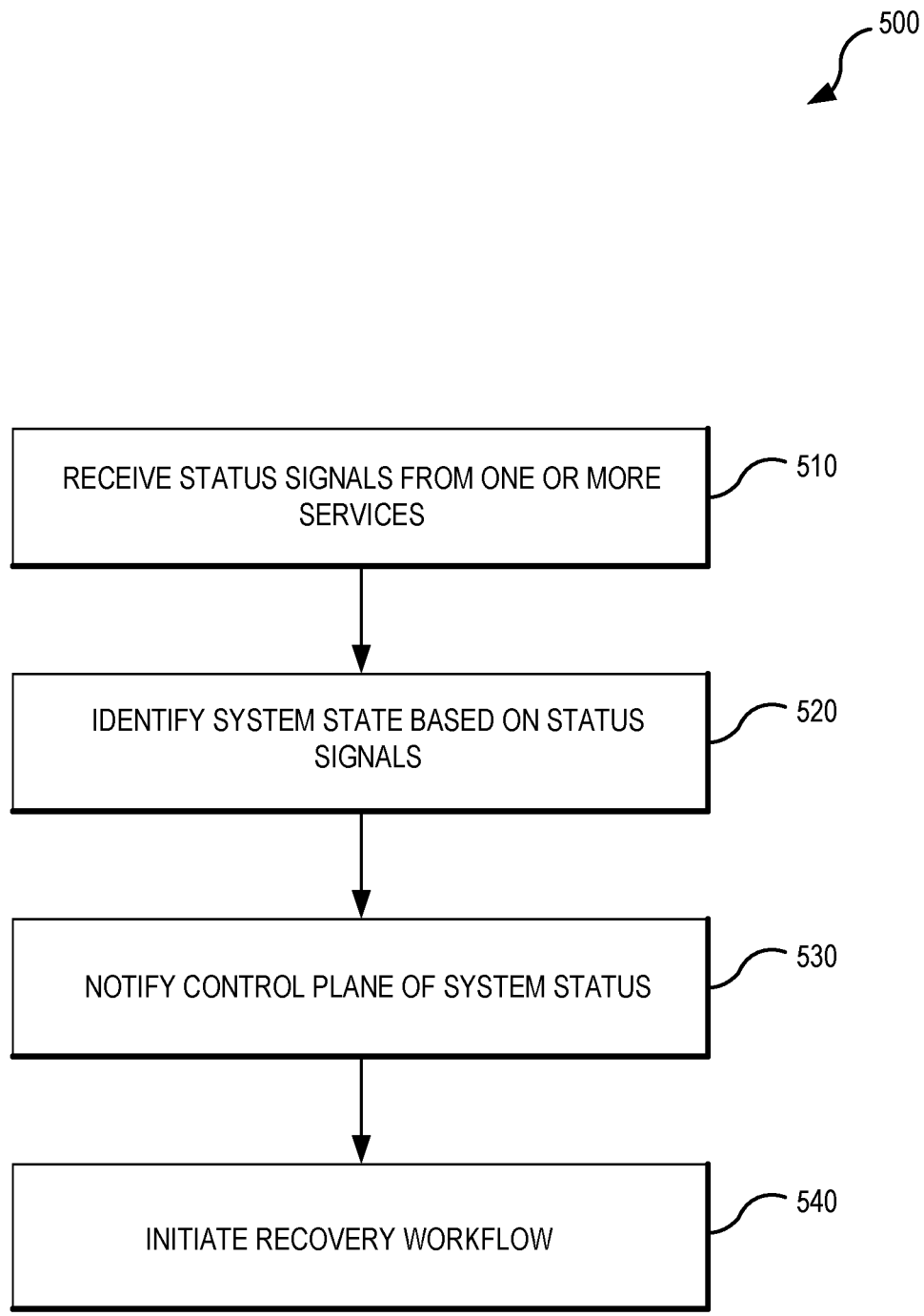
FIG. 5 illustrates an example of a set of operations for initiating a recovery workflow according to one or more embodiments of the present technology.

FIG. 5 illustrates an example of a set of operations 500 for initiating a recovery workflow according to one or more embodiments of the present technology. As illustrated in FIG. 5, receiving operation 510 receives one or more status signals from system components or hosted services. Using the status signals, identification operation 520 can identify a system state. For example, the system state can identify one or more likely root causes. In some embodiments, if multiple causes are identified, identification operation 520 may assign rankings or probabilities as well as a categorization of the type of potential issue.

In some embodiments, various artificial intelligence techniques (e.g., supervised or unsupervised machine learning) may be utilized identifying the potential root cause. As another example, statistical model based anomaly detection can be used in some embodiments. In some embodiments, a finite state machine can be used to track states of the one or more hosted services. The finite state machine can have multiple states which can be reached as conditions of the one or more hosted services are met. Some of the states can call for the execution of a recovery or mitigation workflow.

Notification operation 530 transmits to a control plane where workflow operation 540 can initiate one or more workflows. Examples of the types of actions that can be implemented with workflow operation 540 include, but are not limited to, recycling the one or more hosted services, rebooting one or more servers, switching out a faulty rack, rerouting traffic, collecting additional information, generating one or more notifications to an identified team, or temporarily suppressing team notifications.

Figure 6:
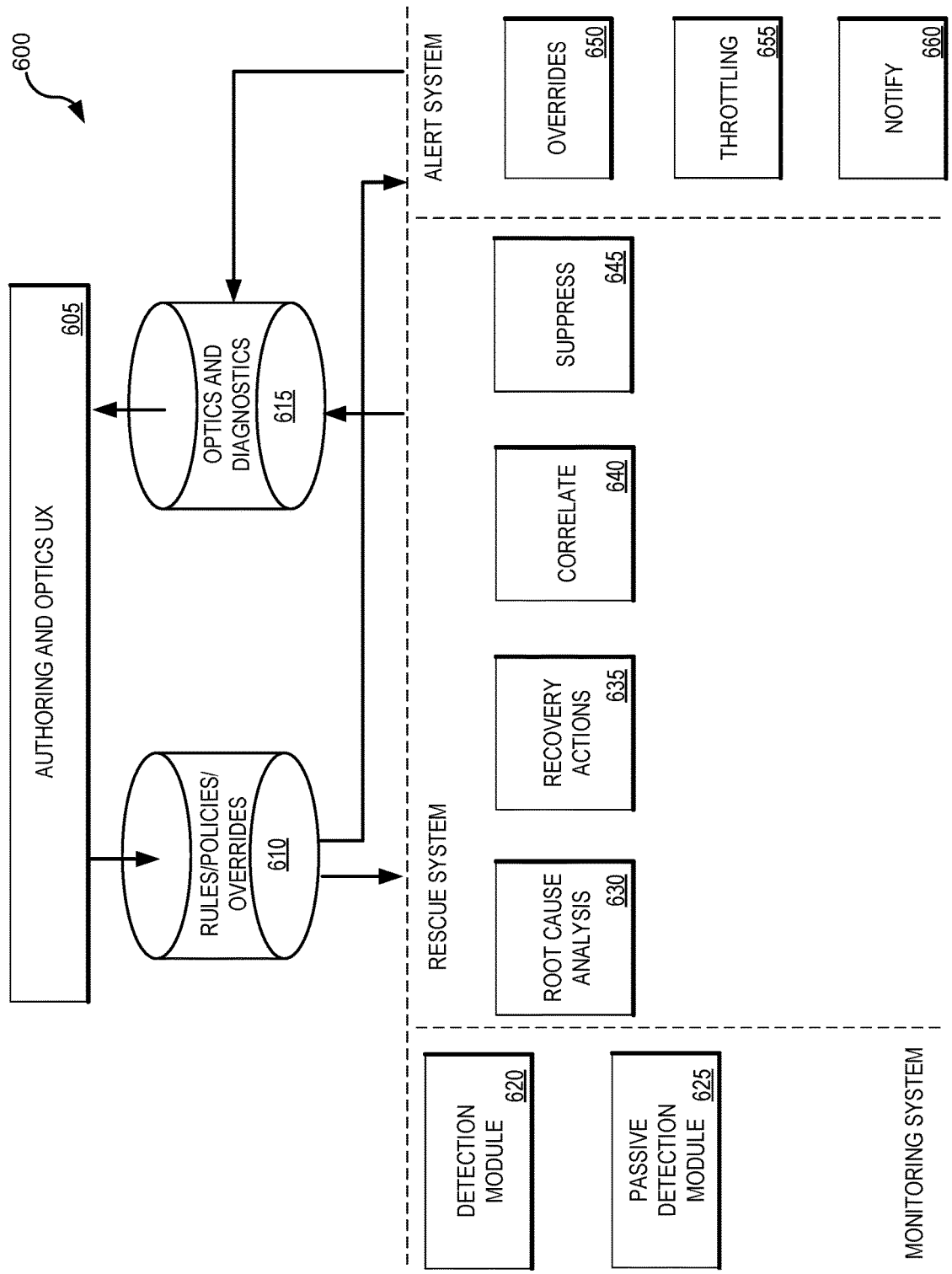
FIG. 6 illustrates a set of components associated with a recovery system that may be used in one or more embodiments of the present technology.

FIG. 6 illustrates a set of components 600 associated with a recovery system that may be used in one or more embodiments of the present technology. As illustrated in FIG. 6, the system can include authoring and optics user interface 605, rule/policies/override database 610, optics and diagnostics database 615, detection module 620, passive detection module 625, root cause analyzer 630, recovery action module 635, correlation module 640, suppression module 645, override module 650, throttling module 655, and notification module 660. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, detection module 620 and passive detection module 625 can be combined into a single module for detecting system states.

Optics user interface 605 can allow users to set rule, policies and overrides that can be stored in rule/policies/override database 610. These rules may include workflow rules and conditions, state identification rules, system configurations and topology information, and the like. In some embodiments, authoring and optics user interface 605 can include a screen to allow a user set actions within a workflow for the recovery services and a second screen to view notifications, workflow status, diagnostic information, current state of the recovery state machine and the like as stored in optics and diagnostics database 615.

Once the rules and policies have been set, detection module 620 can pull information regarding the condition of the system while passive detection module 625 can receive reports and alerts from system components. For example, detection module 620 may detect a service outage or provide active anomaly detection.

These modules can process the information about the system condition and determine whether a problem exists. Root cause analyzer 630 can identify the most likely root cause of the problem. This information can be used by recovery action module 635 to generate one or more recovery actions. Correlation module 640 can monitor the system response and correlate the conditions of the one or more hosted services detected by the monitoring platform to identify one or more recovery actions. Suppression module 645 can determine the severity of the root cause and request additional information (e.g., from detection module 620) to temporarily suppress reporting of the potential condition. For example, a low priority condition may be suppressed until routine reports are generated while high priority conditions may be elevated. Override module 650 can override the suppression signaling. Throttling module 655 can reduce the amount of alert notifications based on override or suppression signaling. Notification module 660 can generate various notification (e.g., description of outage).

Figure 7:
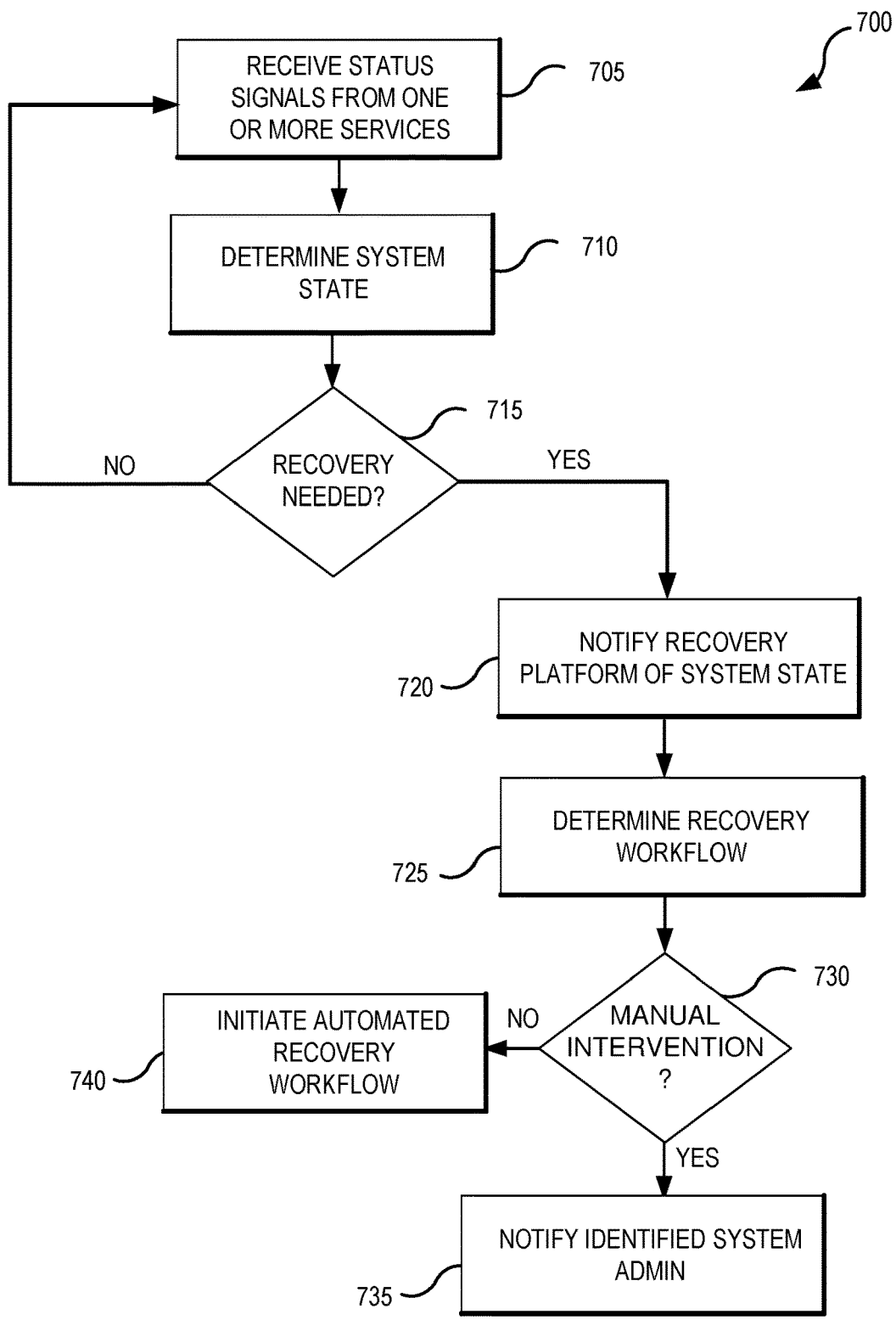
FIG. 7 illustrates an example of a set of operations for operating an automated recovery system according to one or more embodiments of the present technology.

FIG. 7 illustrates an example of a set of operations 700 for operating an automated recovery system according to one or more embodiments of the present technology. As illustrated in FIG. 7, receiving operation 705 receives status signals from one or more services or system components. State identification operation 710 determines the current system state based on the status signals. Recovery determination operation 715 determines whether an intervention is needed to mitigated a potential problem within the system. When recovery determination operation 715 determines that an intervention is not needed, then recovery determination operation 715 branches to receiving operation 705 where the system continues to be monitored. When recovery determination operation 715 determines that an intervention is needed, then recovery determination operation 715 branches to communication operation 720 where a recovery request is communicated to a recovery platform.

Recovery operation 725 identifies a recovery workflow. Intervention operation 730 determines whether manual intervention is needed. When intervention operation 730 determines that manual intervention is needed, intervention operation 730 branches to notification operation 735, where one or notifications are sent to system administrators or engineers. When intervention operation 730 determines that manual intervention is not needed, intervention operation 730 branches to initiation operation 740 where an automated recovery workflow is initiated.

Figure 8:
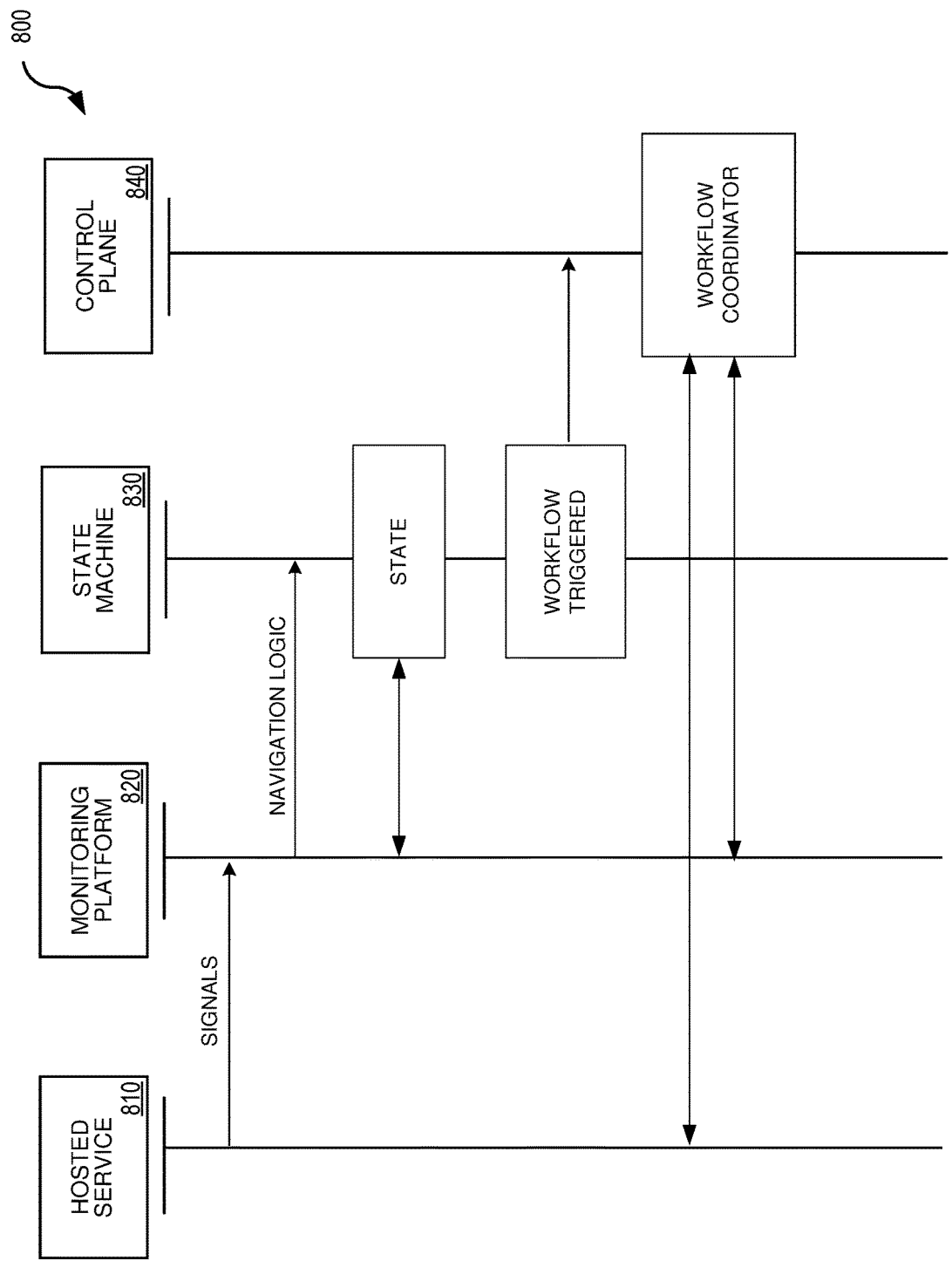
FIG. 8 is a sequence diagram illustrating an example of the data flow between various components of an automated recovery system in accordance with some embodiments of the present technology.

FIG. 8 is a sequence diagram illustrating an example of the data flow between various components of an automated recovery system in accordance with some embodiments of the present technology. As illustrated in FIG. 8, hosted service 810 sends to monitoring platform 820 multiple signals regarding conditions of components within the hosted service. Monitoring platform processes these signals and uses navigation logic to traverse a finite state machine to determine a system state. Once the system state triggers a workflow, state machine 830 can cause a request to be transmitted to control plane 840 where a workflow coordinator can initiate a recovery workflow to correct potential problems within hosted service 810.

FIG. 9 illustrates computing system 910, which is representative of any system or collection of systems in which the various applications, services, scenarios, and processes disclosed herein may be implemented. For example, computing system 910 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 910 may be implemented as a single apparatus, system, or device or may be implemented in a distributed manner as multiple apparatuses, systems, or devices. Computing system 910 includes, but is not limited to, processing system 920, storage system 930, software 940, applications for process 950, communication interface system 960, and user interface system 970. Processing system 920 is operatively coupled with storage system 930, communication interface system 960, and an optional user interface system 970.

Processing system 920 loads and executes software 940 from storage system 930. When executed by processing system 920 for deployment of scope-based certificates in multi-tenant cloud-based content and collaboration environments, software 940 directs processing system 920 to operate as described herein for at least the various processes, operational scenarios, and sequences discussed in the foregoing implementations. Computing system 910 may optionally include additional devices, features, or functionality not discussed for purposes of brevity.

Referring still to FIG. 9, processing system 920 may comprise a micro-processor and other circuitry that retrieves and executes software 940 from storage system 930. Processing system 920 may be implemented within a single processing device, but may also be distributed across multiple processing devices or sub-systems that cooperate in executing program instructions. Examples of processing system 920 include general purpose central processing units, application specific processors, and logic devices, as well as any other type of processing device, combinations, or variations thereof.

Storage system 930 may comprise any computer readable storage media readable by processing system 920 and capable of storing software 940. Storage system 930 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 930 may also include computer readable communication media over which at least some of software 940 may be communicated internally or externally. Storage system 930 may be implemented as a single storage device, but may also be implemented across multiple storage devices or sub-systems co-located or distributed relative to each other. Storage system 930 may comprise additional elements, such as a controller, capable of communicating with processing system 920 or possibly other systems.

Software 940 may be implemented in program instructions and among other functions may, when executed by processing system 920, direct processing system 920 to operate as described with respect to the various operational scenarios, sequences, and processes illustrated herein. For example, software 940 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 940 may include additional processes, programs, or components, such as operating system software, virtual machine software, or application software. Software 940 may also comprise firmware or some other form of machine-readable processing instructions executable by processing system 920.

In general, software 940 may, when loaded into processing system 920 and executed, transform a suitable apparatus, system, or device (of which computing system 910 is representative) overall from a general-purpose computing system into a special-purpose computing system. Indeed, encoding software on storage system 930 may transform the physical structure of storage system 930. The specific transformation of the physical structure may depend on various factors in different implementations of this description. Examples of such factors may include, but are not limited to, the technology used to implement the storage media of storage system 930 and whether the computer-storage media are characterized as primary or secondary storage, as well as other factors.

For example, if the computer readable storage media are implemented as semiconductor-based memory, software 940 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

In general, process 950 can be hosted in the cloud as a service, distributed across computing devices between the various endpoints, hosted as a feature of a cloud enabled information creation and editing solution. Communication interface system 960 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 970 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 970. In some cases, the input and output devices may be combined in a single device, such as a display capable of displaying images and receiving touch gestures. The aforementioned user input and output devices are well known in the art and need not be discussed at length here. In some cases, the user interface system 970 may be omitted when the computing system 910 is implemented as one or more server computers such as, for example, blade servers, rack servers, or any other type of computing server system (or collection thereof).

User interface system 970 may also include associated user interface software executable by processing system 920 in support of the various user input and output devices discussed above. Separately or in conjunction with each other and other hardware and software elements, the user interface software and user interface devices may support a graphical user interface, a natural user interface, an artificial intelligence agent capable of assisting with automation of recovery operations (e.g. an enhanced version of Microsoft's Cortana assistant, Amazon's Alexa, or Apple's Siri, Google's Assistant, etc.), or any other type of user interface, in which a user interface to a productivity application may be presented.

Communication between computing system 910 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A cloud computing service comprising:
one or more hosted services;
a monitoring platform to actively monitor the one or more hosted services in real-time,
wherein the monitoring platform includes a recovery state machine having multiple states that can be reached depending on conditions of the one or more hosted services; and
wherein the multiple states include recovery workflow triggers; and
a control plane communicably coupled to the monitoring platform, the control plane having a workflow coordinator separate from the monitoring platform to manage and execute a recovery workflow that includes multiple step trouble shooting and recovery actions for the one or more hosted services selected in response to receiving one of the recovery workflow triggers from the monitoring platform and responses to implemented recovery actions.

2. The cloud computing service of claim 1, wherein the monitoring platform includes a passive detection module to identify component outages or underlying infrastructure problems.

3. The cloud computing service of claim 1, further comprising a root cause analyzer to identify, based on information collected by the monitoring platform, possible system failures that may be underlying detected failures.

4. The cloud computing service of claim 1, wherein the recovery actions include recycling the one or more hosted services, rebooting one or more servers, switching out a faulty rack, rerouting traffic, collecting additional information, generating one or more notifications to an identified team, or temporarily suppressing team notifications.

5. The cloud computing service of claim 1, further comprising a correlation module to correlate the conditions of the one or more hosted services detected by the monitoring platform to identify one or more recovery actions.

6. The cloud computing service of claim 1, further comprising an optics user interface having at least one screen to allow a user to set actions within a workflow for the recovery actions and at least one screen to view notifications, workflow status, and current state of the recovery state machine.

7. The cloud computing service of claim 1, wherein the monitoring platform can extract, receive, or pull the conditions of the one or more hosted services and generate a time series analysis of the conditions.

8. The cloud computing service of claim 1, wherein the recovery actions include using a machine learning classifier to identify a root cause of an underlying problem consistent with the conditions detected by the monitoring platform.

9. The cloud computing service of claim 1, wherein the one or more hosted services include e-mail and the recovery actions include rebooting one or more mail box servers.

10. A non-transitory computer-readable medium having instructions stored thereon, instructions that when executed by one or more processors cause a machine to:
receive or detect multiple states of one or more hosted services;
automatically perform a root cause analysis to identify an underlying current problem within the one or more hosted services,
wherein the root cause analysis is based, at least in part, on the multiple states of the one or more hosted services; and
determine, based on the underlying current problem identified by the root cause analysis, a recovery workflow that includes a multiple step trouble shooting and execution of multiple workflows selected based on responses detected to executed workflows.

11. The non-transitory computer-readable medium of claim 10, further comprising instructions that when executed by the one or more processors further cause the machine to dynamically build and update a real-time service dependency graph that can be used as part of the root cause analysis.

12. The non-transitory computer-readable medium of claim 10, wherein the multiple states of the one or more hosted services include static states and transient states.

13. The non-transitory computer-readable medium of claim 10, wherein the instructions when executed by the one or more processors cause the machine to execute, as at least part of the root cause analysis, a supervised machine learning model to identify the underlying current problem.

14. The non-transitory computer-readable medium of claim 10, wherein the recovery workflow includes recycling the one or more hosted services, rebooting one or more servers, switching out a faulty rack, rerouting traffic, collecting additional information, generating one or more notifications to an identified team, or temporarily suppressing team notifications.

15. A method comprising:
receiving, via a monitoring platform, a plurality of signals identifying conditions of one or more hosted services;
tracking, via a finite state machine, states of the one or more hosted services that can be reached based on transition conditions met by the plurality of signals;
identifying, at the monitoring platform, a root cause of a potential underlying problem consistent with the conditions of the one or more hosted services;
determining, within a control plane, a recovery or mitigation workflow to resolve the potential underlying problem; and
automatically executing, via the control plane, the recovery or mitigation workflow; wherein the recovery or mitigation workflow includes a multiple step trouble shooting and execution of multiple workflows automatically selected based on responses to executed workflows.

16. The method of claim 15, wherein identifying the root cause of the potential underlying problem includes using supervised or unsupervised machine learning.

17. The method of claim 15, further comprising performing anomaly detection using supervised or unsupervised machine learning and the plurality of signals identifying the conditions of one or more hosted services.

18. The method of claim 15, further comprising performing a statistical model based anomaly detection using the plurality of signals identifying the conditions of one or more hosted services.

19. The method of claim 15, wherein the recovery or mitigation workflow includes recycling the one or more hosted services, rebooting one or more servers, switching out a faulty rack, rerouting traffic, collecting additional information, generating one or more notifications to an identified team, or temporarily suppressing team notifications.

20. The method of claim 15, further comprising dynamically building and updating, as the plurality of signals are received, a real-time service dependency graph that can be used as part of identifying the root cause.

* * * * *